(12) United States Patent
Roumeliotis et al.

(10) Patent No.: US 8,145,240 B2
(45) Date of Patent: Mar. 27, 2012

(54) GEOGRAPHIC POSITION BASED REWARD SYSTEM

(75) Inventors: Tasos Roumeliotis, Orinda, CA (US); Joel Grossman, San Francisco, CA (US); Gabriel Saunkeah, Berkeley, CA (US); Jacqueline Allison Bernstein, San Francisco, CA (US); Scott Hotes, Berkeley, CA (US)

(73) Assignee: WaveMarket, Inc., Emeryville, CA (US)

( * ) Notice: Subject to any disclaimer, the term of this patent is extended or adjusted under 35 U.S.C. 154(b) by 520 days.

(21) Appl. No.: 12/406,774

(22) Filed: Mar. 18, 2009

(65) Prior Publication Data
US 2010/0240399 A1 Sep. 23, 2010

(51) Int. Cl.
*H04W 24/00* (2009.01)
*H04M 3/42* (2006.01)
*G06Q 30/00* (2012.01)

(52) U.S. Cl. .............. 455/456.3; 455/414.2; 705/14.58; 705/14.64

(58) Field of Classification Search .............. 455/456.1, 455/456.2, 456.3, 456.5, 456.6, 414.1, 414.2, 455/414.3; 705/14.58, 14.64
See application file for complete search history.

(56) References Cited

U.S. PATENT DOCUMENTS

| | | | |
|---|---|---|---|
| 6,437,696 B1 | 8/2002 | Lemelson et al. | |
| 6,701,234 B1 | 3/2004 | Vogelsang | |
| 6,834,195 B2 | 12/2004 | Brandenberg et al. | |
| 6,873,850 B2 | 3/2005 | Dowling et al. | |
| 6,895,238 B2 | 5/2005 | Newell et al. | |
| 6,961,562 B2 | 11/2005 | Ross | |
| 6,985,696 B2 | 1/2006 | Bromham et al. | |
| 2004/0214584 A1 | 10/2004 | Marinier | |
| 2008/0119207 A1 | 5/2008 | Harris | |
| 2008/0153511 A1 | 6/2008 | Mock | |

*Primary Examiner* — Christopher M Brandt
(74) *Attorney, Agent, or Firm* — Dovas Law, P.C.

(57) ABSTRACT

A computer-implemented method of rewarding a user based on compliance with predetermined geographic limitations is provided. The method includes receiving from a first user and storing an indication of one or more geographic areas. Mobile device location information of a user mobile device associated with a second user is received from the user mobile device or a remote telecommunication carrier server in communication with the user mobile device. The mobile device location information is compared with the indication of the one or more geographic areas. An indication of a reward is transmitted to the user mobile device based on the comparison of the mobile device location information and the indication of the one or more geographic areas. Systems for rewarding a user based on compliance with predetermined geographic limitations are also provided.

37 Claims, 6 Drawing Sheets

GEOGRAPHIC POSITION BASED REWARD SYSTEM

BACKGROUND

While increasingly unfettered mobility is a normal part of modern life, it is desirable for those in positions of authority to assert a level of control over the mobility of those for whom they are responsible. Many social groups require the imposition of such mobility control, requiring that a level of authority be established and maintained between group members, for example the authority of a parent over a son or daughter within a family, the authority of an employer over an employee in a work environment, and the authority of a teacher over a student at a school. In consideration of safety or the law, teachers or parents may wish that children for whom they are responsible avoid certain locations or adhere to certain pre-defined routes on their way to and from school or other destinations. Employers, in an effort to enhance worker productivity, may wish to enforce schedules defining where employees should be at particular times during the work day.

The growing ubiquity of locatable mobile devices such as mobile telephones, cellular-enabled personal computers and GPS systems potentially provides those in positions of authority with at least the means to locate someone over whom they maintain authority. Regardless, independent minds, whether children or adults, are apt to consider controls placed on their mobility to be especially onerous and therefore may endeavor to hinder attempts to assert control or otherwise express their dissent. It would be desirable to provide an effective method for establishing and maintaining mobility control over a user of a locatable mobile device.

SUMMARY

The present invention provides a computer-implemented method of rewarding a user based on compliance with predetermined geographic limitations. The method includes receiving from a first user and storing an indication of one or more geographic areas. Mobile device location information of a user mobile device associated with a second user is received from the user mobile device or a remote telecommunication carrier server in communication with the user mobile device. The mobile device location information is compared with the indication of the one or more geographic areas. An indication of a reward is transmitted to the user mobile device based on the comparison of the mobile device location information and the indication of the one or more geographic areas.

The present invention also provides a system for rewarding a user based on compliance with predetermined geographic limitations. The system includes a computing device including a memory with instructions operable to enable the computing device to perform a procedure including receiving and storing an indication of one or more geographic areas. The computing device is also enabled to receive mobile device location information of a user mobile device associated with a user. The computing device is further enabled to compare the mobile device location information with the indication of one or more geographic areas and transmit an indication of a reward to the user mobile device based on the comparison of the mobile device location information and the indication of one or more geographic areas.

The present invention further provides a system including a computing device including a memory with instructions operable to enable the computing device to perform a procedure including receiving from a first user and storing an indication of an allowable geographic area associated with a second user and receiving from the first user an indication of a predetermined period of time. The computing device is also enabled to receive mobile device location information of a user mobile device associated with the second user from the user mobile device or a remote telecommunication carrier server in communication with the user mobile device. The computing device is further enabled to log one or more failures of the mobile device to exit the allowable geographic area during the predetermined period of time as indicated by the mobile device location information and transmit an indication of a reward to the user mobile device in response to logging the one or more failures of the mobile device to exit the allowable geographic area during the predetermined period of time.

The present invention further provides a system including a computing device including a memory with instructions operable to enable the computing device to perform a procedure including receiving an indication of a disallowable geographic area and an indication of a predetermined period of time. The computing device is also enabled to receive mobile device location information of a user mobile device associated with the user. The computing device is further enabled to transmit an indication of a reward to the user mobile device based on a failure of the user mobile device to enter the disallowable geographic area during the predetermined period of time as indicated by the mobile device location information.

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

Figure 1:
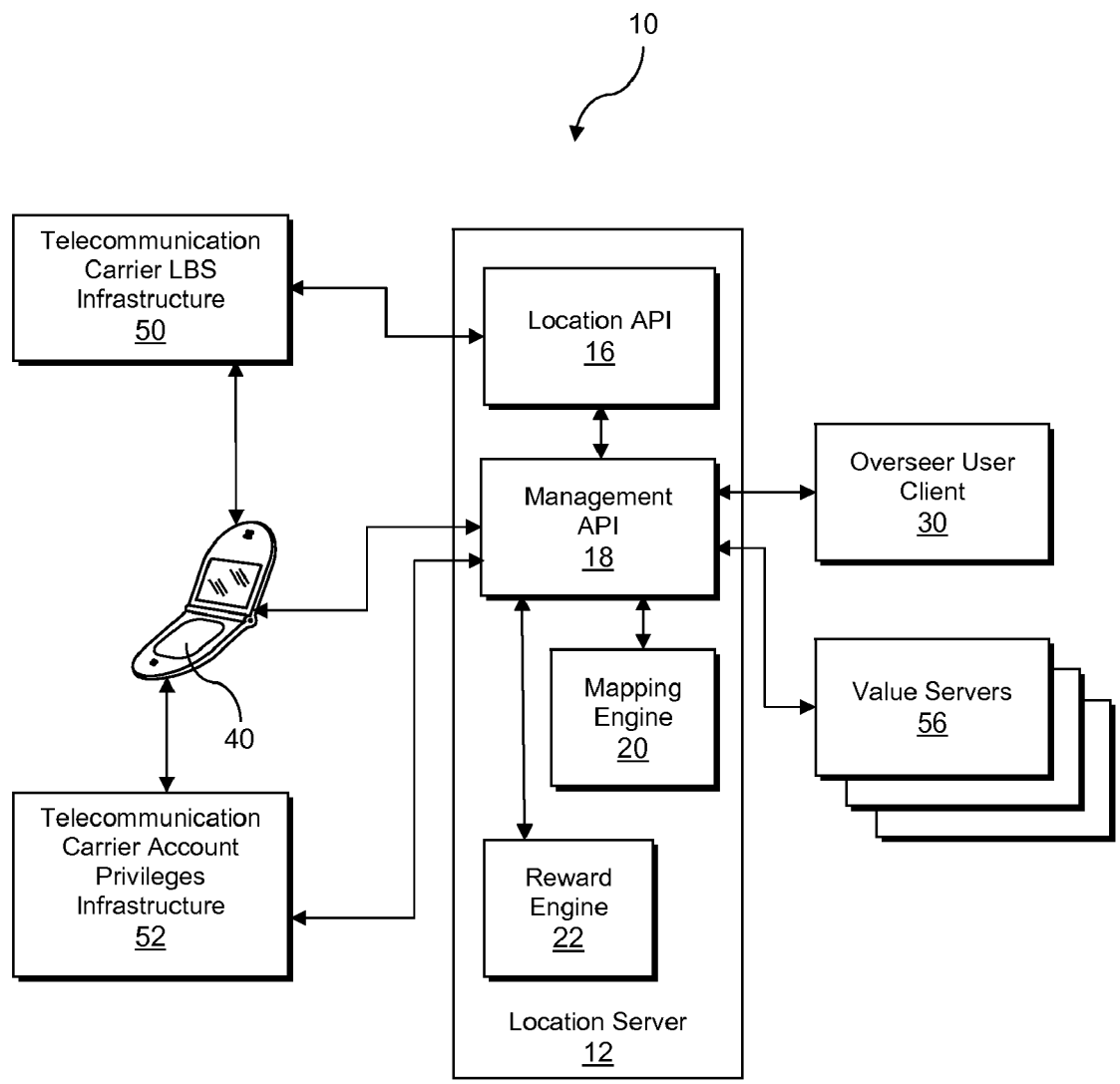
FIG. 1 is a schematic illustration of an exemplary operating environment in which a system for rewarding a user based on compliance with predetermined geographic limitations is operable according to a preferred embodiment of the present invention.

Certain terminology is used in the following description for convenience only and is not limiting. The words "a" and "one" are defined as including one or more of the referenced item unless specifically stated otherwise. This terminology includes the words above specifically mentioned, derivatives thereof, and words of similar import. The phrase "at least one" followed by a list of two or more items, such as A, B, or C, means any individual one of A, B or C as well as any combination thereof.

The preferred embodiments of the present invention are described below with reference to the drawing figures where like numerals represent like elements throughout.

Referring to FIG. 1, a schematic illustration of an exemplary operating environment 10 is shown in which a preferred system for rewarding a user based on compliance with predetermined geographic limitations in the form of a location server 12 may be used. The location server 12 includes one or more computing devices and one or more memory devices, which computing devices and memory devices may be integrally constructed or connected in any suitable manner, for example via a network. The location server 12 provides a platform which enables a location application program interface (API) 16, a management API 18, a mapping engine 20, and a rewards engine 22.

The management API 18 is preferably configured to establish an overseer user account using identifying information of an overseeing user who desires to provide a reward, and a subject user account using identifying information of a subject user, associated with a subject user mobile device 40, whom the overseeing user desires to track and to whom the reward may be provided. The location server 12 is configured to receive the identifying information through the management API 18 from an overseer user client 30 operated by an overseeing user, such as a personal computer, mobile telephone device, or global positioning system (GPS) enabled device, via a network connection, which network connection is preferably an Internet network connection. As set forth in this description, an overseeing user may include a person, for example a parent, guardian, or employer of a subject user. Alternatively, the overseeing user may include a non-person, for example a computing device configured to implement oversight requirements of a parent, guardian or employer of a subject user, or configured to enforce rules of a game in which a subject user is participating.

The received identifying information may be personal and/or specific to a mobile device used by the subject user or overseer user. The received subject user identifying information preferably includes one or more of the name of the subject user, a telephone number associated with the subject user mobile device 40, a telecommunication carrier identifier, for example an account number, associated with the subject user mobile device used to establish a connection with a telecommunication carrier providing service for the subject user mobile device 40, and a device-specific identifier of the subject user mobile device 40. A device-specific identifier, such as a MAC address, is required for embodiments of the invention in which the subject user mobile device 40 is not associated with any telecommunication carrier, for example a stand-alone GPS device not requiring telecommunication carrier service. Similarly, the received overseeing user identifying information preferably includes one or more of the name of the overseer user, a telephone number associated with a mobile device used by the overseer user, a telecommunication carrier identifier providing service to an overseer user's mobile device, and a device-specific identifier of an overseer user's mobile device.

The management API 18 preferably provides an interface to the overseer user through a client application running on the overseer user client 30 and another interface to the subject user through a client application running on the subject user mobile device 40. The client application or applications preferably include a web client application, WAP client application, short message service (SMS) application, interactive voice response (IVR) application or other suitable client application, which client applications may include firmware or software downloadable by the user or others to the subject user mobile device 40 or the overseer user client 30. The location server 12 is configured to receive via the management API 18 an indication of one or more geographic areas from the overseer user client 30, the one or more geographic areas preferably corresponding to areas which the subject user is permitted to travel or not permitted to travel by the overseeing user. The location server 12 is preferably configured to receive information including one or more rules sets from the overseer user client 30 defining the desired behavior of the subject user with respect to the one or more geographic areas and providing indications of periods of time when the desired behaviors are applicable to the travel of the subject user. The location server 12 is further configured to transmit information to the subject user mobile device 40, including the geographic areas, rules sets, and predetermined periods of time, to provide the subject user with notification of the required travel behaviors.

The indication of one or more geographic areas is stored in a database configured via a mapping engine 20. The location server 12 is preferably configured to receive via the location API 16 location information of the subject user mobile device 40 from a location based service (LBS) infrastructure 50 of a telecommunication carrier providing telecommunication service to the subject user mobile device 40. The LBS infrastructure 50 preferably receives the location information or data required to generate the location information from the subject user mobile device 40. Alternatively, the location server 12 may receive location information of the subject user mobile device 40 directly from the subject user mobile device 40, especially in instances where the mobile device 40 is a stand-alone device. Alternatively, the location server may receive location information from any suitable source in contact with the subject user mobile device 40. Preferably, the LBS infrastructure 50 or subject user mobile device 40 transmits location information to the location server 12 in the form of latitude and longitude of the subject user mobile device 40, which latitude and longitude may be determined via known methods such as tower-based or satellite (GPS) triangulation. The mapping engine 20 is configured to compare the mobile device location information with the indication of the one or more geographic areas, and the location server 12 via the management API 18 transmits an indication of a reward generated by a reward engine 22, preferably including a commendation or rebuke, to the subject user mobile device 40 based on the results of the comparison. Alternatively, the location server 12 via the management API 18 may store the indication of a reward generated by a reward engine 22 without transmitting the indication of the reward to the subject user mobile device 40, and the location server may thereafter communicate the indication of the reward to the subject user through a device other than the subject user mobile device 40, for example through a client application running on another device which transmits a request for the indication of the reward.

The management API 18 transmits an instruction to the reward engine 22 to generate an indication of a reward based on the comparison of the mobile device location with the indication of the one or more geographic areas. The indication of a reward preferably includes an indication of permissions granted to or revoked from the subject user. Granted or revoked permissions preferably include modifications to the indication of the one or more geographic areas or modifications in communication permissions.

Modifications in communication permissions preferably include increases or decreases in a number of permitted sent or received SMS messages by the subject user mobile device 40, increases or decreases in a permitted duration of voice telephone calls made by the subject user mobile device 40, and increases or decreases in permitted data traffic though the subject user mobile device 40, for example mobile web or WAP data traffic or other application data traffic. Modifications in communication permissions preferably further include changes in from which of the one or more geographic areas the subject user mobile device 40 can send or receive SMS messages or other data, and which of the one or more geographic areas the subject user mobile device 40 can place voice telephone calls to or receive voice telephone calls from. Modifications in communication permissions preferably further include changes in which telephone numbers the subject user mobile device 40 can send SMS messages or other data to or receive SMS messages or other data from, or place voice telephone calls to or receive voice telephone calls from, for example white-listed telephone numbers. Modifications in communication permissions preferably further include changes in which telephone numbers the subject user mobile device 40 cannot send SMS messages or other data to or receive SMS messages or other data from or place voice telephone calls to or receive voice telephone calls from, for example black-listed telephone numbers.

Coinciding with transmitting indications of communication permissions granted to or revoked from the subject user, the management API 18 preferably transmits instructions to a communications infrastructure 52 of a telecommunications carrier to implement changes in communication permissions associated with the subject user mobile device 40 consistent with the indication of a reward. The indication of a reward may alternatively include digital goods awarded to the subject user such as mobile device ringtones and application content, or indications of redeemable value such as a coupons or gift certificate codes which may be redeemed at predetermined establishments, for example online or physical stores. The reward engine 22 may be configured to autonomously generate and transmit through the management API 18 digital goods or indications of redeemable value to the subject user mobile device 40, or alternatively, the management API 18 may request and receive digital goods or indications of redeemable value from one or more remote value servers 56 configured to generate and transmit digital goods or indications of redeemable value. The management API 18 may further require a request for the digital goods or indications of redeemable value from the subject user via the subject user mobile device 40 or via another suitable client to initiate a transmission of the digital goods or indications of redeemable value to the subject user mobile device 40 or to another suitable client associated with the subject user.

The location server 12 via the management API 18 may alternatively transmit an indication to a remote value server 56 to transmit value from or to a first account associated with the overseer user to or from a second account associated with the subject user based on the comparison of the received mobile device location information and the indication of the one or more geographic areas. The remote value server 56 in such instance may include a banking server of a bank, or alternatively, a server of another monetary or non-monetary value managing entity, for example a server managing store credit, store coupon distribution, or digital goods distribution. The indication of a reward transmitted to the subject user mobile device 40 may include an indication of value transferred from or to the account associated with the subject user or an indication of redeemable value such as a coupon or gift certificate code.

The location server 12 is preferably further configured to receive from the overseeing user via the management API 18 information including a rules set for modifying the indication of the one or more geographic areas. The mapping engine 20 is configured to modify the indication of the one or more geographic areas based on the comparison of the mobile device location information received from the LBS infrastructure 50 or the subject user mobile device 40 and the indication of the one or more geographic areas to produce an indication of one or more modified geographic areas in accordance with the geographic area modification rules set. Preferably, the geographic area modification rules set includes one or more additional geographic area indications to be added to or subtracted from the indication of one or more geographic areas to create the indication of one or more modified geographic areas. Thereafter, the mobile device location information is compared with the indication of the one or more modified geographic areas, and the indication of a reward is transmitted to the user mobile device 40 based on the comparison of the mobile device location information and the indication of the one or more modified geographic areas. A subject user is preferably notified of modifications to the geographic areas by the indication of a reward. In such manner, a subject user may receive additional travel privileges or have travel privileges revoked through modification to geographic area indications for adhering to or failing to adhere to location requirements set forth by the overseeing user.

The location server 12 is preferably further configured to receive from the overseeing user via the management API 18 information comprising a rules set for modifying an indication of a period of time during which a particular indication of one or more geographic areas is applicable to the subject user. Based on the comparison of the mobile device location information received from the LBS infrastructure 50 or subject user mobile device 40 and the indication of the one or more geographic areas, the indication of a period of time is modified to produce an indication of one or more modified periods of time in accordance with the period of time modification rules set. A subject user is preferably notified of modifications to the period of time by the indication of a reward. In such manner, a subject user may receive additional travel privileges or have travel privileges revoked for adhering to or failing to adhere to location requirements set forth by the overseeing user through execution of modifications to a period of time during which a particular indication of one or more geographic areas is applicable.

In a preferred operation mode of the location server 12, the indication of one or more geographic areas is preferably received from the overseer user client 30 through the management API 18 as an indication of one or more disallowable geographic areas into which the overseeing user prefers the subject user not to enter. The indication of one or more disallowable geographic areas preferably includes an indication of a bounded area, for example an area defined by the borders of a neighborhood, city, or state. An indication of a period of time is preferably received from the overseer user client 30 through the management API 18, the period of time being a duration which the overseeing user desires the subject user to remain out of the disallowable geographic area prior to providing the subject user with an indication of a reward. The period of time may be of any desired duration from a few hours, to several days, to several weeks. The mapping engine 20 is configured to determine whether the subject user mobile device 40 fails to enter the disallowable geographic area during the predetermined period of time as indicated by the mobile device location information, and the location server 12 via the management API 18 transmits the indication of a reward generated by the reward engine 22 to the subject user mobile device 40 upon a failure of the mobile device 40 to enter the disallowable geographic area during the predetermined period of time. Preferably, the predetermined period of time is provided as a plurality of predetermined periods of time, such as a plurality of days or weeks, and the location server 12 is configured to log whether the mobile device 40 failed to enter the disallowable geographic area during each of the plurality of predetermined periods of time and generate and transmit to the subject user mobile device 40 the indication of a reward in response to logging a predetermined number of failures to enter the disallowable geographic area during preferably consecutive ones of the plurality of predetermined periods of time. At the option of the overseeing user, different ones of the plurality of predetermined periods of time may be associated with different disallowable geographic areas. For example, a period of time including nighttime hours may correspond to disallowable geographic areas, which areas are not disallowable during a period of time including daytime hours.

At the option of the overseeing user in response to logging the one or more failures of the subject user mobile device 40 to enter the disallowable geographic area or areas during the predetermined period of time, the management API 18 transmits instructions to a communications infrastructure 52 of a telecommunications carrier to implement changes in communication permissions of the subject user mobile device 40, preferably providing increased telephone calling or SMS messaging privileges to the subject user mobile device 40. Further, at the option of the overseeing user in response to logging the one or more failures of the mobile device 40 to enter the disallowable geographic area or areas during the predetermined period of time, the management API 18 transmits digital goods or indications of redeemable value, generated by the rewards engine 22, or alternatively, generated by a remote value server 56 to the subject user mobile device 40. Further, at the option of the overseeing user in response to logging the one or more failures of the mobile device 40 to enter the disallowable geographic area or areas during the predetermined period of time, the management API 18 transmits an indication to a remote value server 56 to transmit value from the first account associated with the overseeing user to the second account associated with the subject user. A subject user is preferably notified by the indication of a reward of changes in communication permissions, receipts of digital goods, receipts of indications of redeemable value, and transmissions of value to an account of the subject user.

Further at the option of the overseeing user in response to logging the one or more failures of the mobile device 40 to enter a disallowable geographic area during the predetermined period of time, the mapping engine 20 modifies the indication of the one or more disallowable geographic areas preferably by subtracting one or more disallowable geographic areas or portions thereof in a manner consistent with the rules set provided by the overseeing user. Further at the option of the overseeing user in response to logging the one or more failures of the mobile device 40 to enter a disallowable geographic area during the predetermined period of time, the mapping engine 20 preferably modifies an indication of a plurality of periods of time preferably by increasing the duration of ones of the plurality of periods of time corresponding to one or more smaller or lesser in number disallowable geographic areas and decreasing the duration of ones of the plurality of periods of time corresponding to one or more larger or greater in number disallowable geographic areas, consistent with the rules set provided by the overseeing user. Thereafter, the generation and transmission of the indication of a reward is based on a comparison of the mobile device location information and an indication of the modified disallowable geographic area or areas and/or modified plurality of periods of time. A subject user is preferably notified by the indication of a reward of modifications to the geographic areas and plurality of periods of time. The subject user is motivated to avoid the disallowable geographic areas by receiving the above-indicated positive reinforcement.

The location server 12 is alternatively configured to log entrances into the one or more disallowable areas, in which case the indication of a reward is preferably transmitted to the mobile device 40 in the form of a rebuke in response to logging a predetermined number of entrances into the one more disallowable geographic areas. For example, an indication of a reward in the form of a rebuke may be transmitted to the mobile device 40 in response to one logged entrance into a disallowable geographic area during a one week period. Alternatively for example, a subject user may be permitted a predetermined plurality of entrances into a particular geographic area each week, and entrances exceeding the permitted number during a one week period will trigger generation and transmission of an indication of a reward in the form of a rebuke. Such configuration may be useful for example to a parent overseeing user who wishes their child subject user to visit a playground only twice per week during weeks when school is in session.

Further at the option of the overseeing user in response to logging the entrances in the disallowable geographic area, the management API 18 transmits an indication to the remote value server 56 to transmit value to the first account associated with the overseeing user from the second account associated with the subject user, the mapping engine 20 implements a restrictive modification of the one or more geographic areas, the mapping engine 20 implements a restrictive modification of the one or more predetermined periods of time, and/or the location server 12 via the management API 18 transmits an instruction to an account privileges infrastructure 52 of a telecommunication carrier to enable restrictive modification of permission settings on the subject user mobile device 40. In such manner, the subject user is motivated not to enter the disallowable geographic areas to avoid the above-indicated negative consequences.

Figure 2:
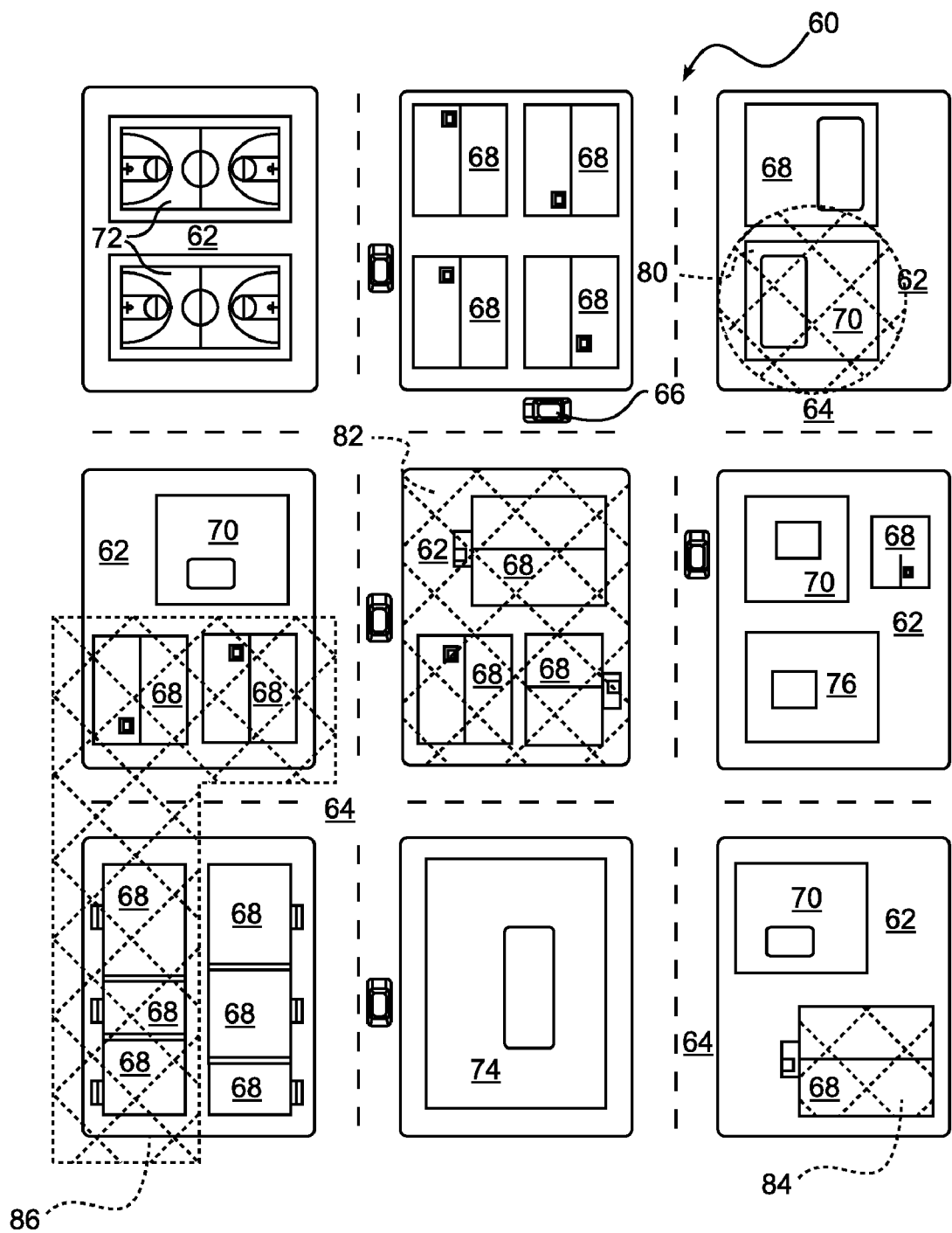
FIGS. 2-5 are plan views of an example city streetscape in which the preferred system for rewarding a user of FIG. 1 is implemented.

Referring to FIG. 2, a plan view is shown of an example city streetscape 60 in which the preferred system for rewarding a user is implemented. The streetscape 60 includes city blocks 62 separated by streets 64 permitting travel of vehicles 66. Various structures are provided on the city blocks 62 including homes 68, commercial establishments 70, playgrounds 72, a school 74, and a library 76. In this example, the location server 12 receives through the management API 18 indications of first, second, third, and fourth disallowable geographic areas 80, 82, 84, 86 corresponding to a commercial establishment 70, a city block 62, and a home 68, respectively. Each indication of a disallowable geographic area is preferably received from the overseer user client 30 as an indication of a disallowable address and a manner of associating a geographic area with the disallowable address, wherein the management API 18 provides the overseer user client 30 with a plurality of predetermined selectable manners of associating a geographic area with the disallowable address. A first preferred user-selectable manner in which a geographic area is to be associated with a disallowable address includes defining the geographic area by a radius extending from an approximate center of a disallowable address, as shown for example by the first disallowable geographic area 80, which is a circular area having center at an approximate center of the property of the underlying commercial establishment 70. A second preferred user-selectable manner in which a geographic area is to be associated with a disallowable address includes defining an area by a perimeter of a block 62 on which the disallowable address is located, as shown for example by the second disallowable geographic area 82. A third preferred user-selectable manner in which an area is to be associated with a disallowable address includes defining an area by a perimeter of a property corresponding to the entered address or a structure on the property, as shown for example by the third disallowable geographic area 84. A fourth preferred user-selectable manner in which an area is to be associated with a disallowable address includes defining an area by a neighborhood in which the address is located, as shown for example by the fourth disallowable geographic area 84, shown as an irregular polygon. Alternatively, the overseeing user may provide an indication of the neighborhood, region, city, state or any definable area, without providing an address, preferably through selection of one or more of a plurality of predetermined defined areas provided by the management API 18 via the overseer user client 30. The mapping engine 20 is preferably configured to use stored streetscape data to generate the disallowable geographic area based on the selected disallowable address and the selected manner in which a geographic area is to be associated with the disallowable address provided through the overseer user client 30.

In another preferred operation mode of the location server 12, the indication of one or more geographic areas is preferably received from the overseer user client 30 through the management API 18 as an indication of one or more allowable geographic areas from which the overseeing user prefers the subject user not to leave. The indication of one or more allowable geographic areas preferably includes an indication of a path or paths from which the overseeing user desires the subject user not to stray from during travel and/or an indication of a desired bounded area, for example an area defined by the borders of a neighborhood, city, or state. An indication of a period of time is preferably received from the overseer user client 30 through the management API 18, the period of time defining a duration which the overseeing user desires the subject user to remain within the allowable geographic area prior to providing the subject user with an indication of a reward. The period of time may be of any desired duration from a few hours, to several days, to several weeks. The mapping engine 20 is configured to determine whether the subject user mobile device 40 fails to exit the allowable geographic area during the predetermined period of time as indicated by the mobile device location information, and the location server 12 via the management API 18 transmits the indication of a reward to the subject user mobile device 40 upon a failure of the mobile device 40 to exit the allowable geographic area during the predetermined period of time. Preferably, the predetermined period of time is provided as a plurality of predetermined periods of time, such as a plurality of days or weeks, and the location server 12 is configured to log whether the mobile device 40 failed to exit the allowable geographic area during each of the plurality of predetermined periods of time, and thereafter, generate and transmit to the subject user mobile device 40 the indication of a reward in response to logging a predetermined number of failures to exit the allowable geographic area during preferably consecutive ones of the plurality of predetermined periods of time. Alternatively, the location server 12 is configured to log a duration of time in which the mobile device 40 maintains a continuous presence in the allowable geographic area during the plurality of predetermined period of times, and to transmit the indication of a reward to the user mobile device 40 in response to logging a predetermined value of the duration of time in which the mobile device maintains a continuous presence in the allowable geographic area.

Alternatively, the location server 12 is configured to log a number of times the subject user mobile device exits the allowable geographic area during the predetermined period of time. In such case, the indication of a reward is preferably transmitted to the subject user mobile device 40 in the form of a rebuke in response to logging a predetermined number of exits from the allowable geographic areas. For example, the indication of a reward in the form of a rebuke may be transmitted in response to one logged exit from an allowable geographic area in a week. Alternatively for example, a subject user may be permitted a predetermined number of exits from a particular allowable geographic area per each week, and exits exceeding the permitted number will trigger an indication of a reward in the form of a rebuke. Such configuration may be useful for example to a parent overseeing user who wishes their child subject user to leave their home during evening hours not more than two days per week during weeks when school is in session.

At the option of the overseeing user, different ones of the plurality of predetermined time periods may be associated with different allowable geographic areas. The overseeing user is enabled through the management API 18 to create a schedule for a subject user wherein the overseeing user may indicate where a subject user is permitted to be at particular times during a day or a plurality of days. The location server 12 receives from the overseeing user through the management API 18 a plurality of allowable geographic areas and a plurality of periods of time, wherein each of the plurality of allowable geographic areas corresponds to a respective one of the plurality of periods of time. As an example, a period of time including daytime hours may correspond to certain allowable geographic areas, which areas are not designated as allowable during a period of time including nighttime hours. Upon receiving from the overseeing user the indication of a plurality of geographic areas corresponding to the respective plurality of periods of time, the mapping engine 20 generates a plurality of time-based geographic area designations, each including an indication of an allowable geographic area and a period of time in which a subject user is allowed to be present within the allowable geographic area. The mobile device location information is received via the location API 16 as a plurality of positions of the user mobile device corresponding to respective times of position recordation. The mapping engine 20 compares the time-based geographic area designations with the plurality of positions of the subject user mobile device 40 as corresponding to respective times of position recordation, and the location server 12 via the management API 18 transmits the indication of a reward to the subject user mobile device 40 based on the comparison of the time-based geographic area designations with the plurality of positions of the subject user mobile device 40 as corresponding to respective times of position recordation. As such, a subject user may be motivated to comply with a predetermined schedule in the form of the time-based geographic area designations. For, example a child subject user may be motivated to comply with time-based geographic limitations including remaining on a school property between the hours of 9:00 am and 3:00 pm, remaining on a library property between the hours of 2:00 pm and 5:00 pm, and remaining at the child subject user's residence between the hours of 4:00 pm and 9:00 am. Alternatively, time-based geographic limitations may include indications of disallowable geographic areas, such that a subject user is motivated to avoid certain geographic areas during designated time periods. The time-based geographic area designations may be daily-recurring such that a plurality of consecutive or non-consecutive days may share the same schedule in the form of the time-based geographic area designations.

At the option of the overseeing user in response to logging the one or more failures of the subject user mobile device 40 to exit the allowable geographic area or areas during the predetermined period of time, the management API 18 transmits instructions to a communications infrastructure 52 of a telecommunications carrier to implement changes in communication permissions of the subject user mobile device 40, preferably providing increased telephone calling or SMS messaging privileges to the subject user mobile device 40. Further, at the option of the overseeing user in response to logging the one or more failures of the mobile device 40 to exit the allowable geographic area or areas during the predetermined period of time, the management API 18 transmits digital goods or indications of redeemable value, generated by the rewards engine 22, or alternatively, generated by a remote value server 56 to the subject user mobile device 40. Further at the option of the overseeing user, the management API 18 preferably transmits in response to logging the one or more failures of the mobile device 40 to exit the allowable geographic area during the predetermined period of time an indication to a remote value server 56 to transmit value from the first account associated with the overseeing user to the second account associated with the subject user. A subject user is preferably notified by the indication of a reward of changes in communication permissions, receipts of digital goods, receipts of indications of redeemable value, and transmissions of value to an account of the subject user.

Further at the option of the overseeing user in response to logging the one or more failures of the mobile device 40 to exit the allowable geographic area during the predetermined period of time, the mapping engine 20 modifies the indication of the one or more allowable geographic areas preferably by adding one or more allowable geographic areas, consistent with the rules set provided by the overseeing user. Further at the option of the overseeing user in response to logging the one or more failures of the mobile device 40 to exit the allowable geographic area during the predetermined period of time including a plurality of periods of time, the mapping engine 20 preferably modifies an indication of the plurality of periods of time preferably by increasing the duration of ones of the plurality of periods of time corresponding to one or more larger or greater in number allowable geographic areas and decreasing the duration of ones of the plurality of periods of time corresponding to one or more smaller or lesser in number allowable geographic areas consistent with the rules set provided by the overseeing user. Thereafter, the generation and transmission of the indication of a reward is based on a comparison of the mobile device location information and an indication of the modified allowable geographic area or areas and/or modified plurality of periods of time. A subject user is preferably notified of modifications to the allowable geographic areas and plurality of periods of time by the indication of a reward. Accordingly, the subject user is motivated not to exit the allowable geographic areas by receiving the above-indicated positive reinforcement.

Figure 3:
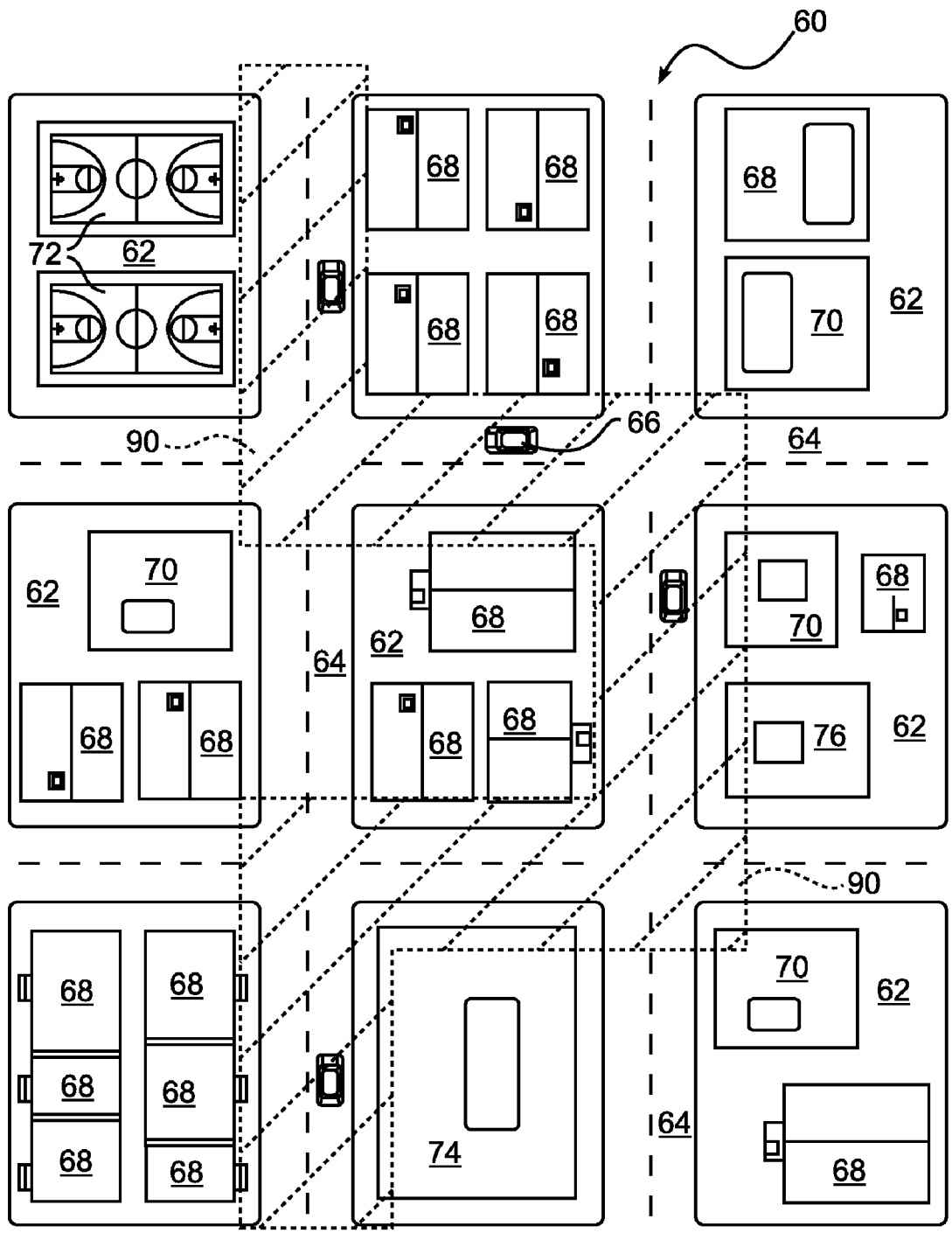

Referring to FIG. 3, a plan view of the example city streetscape 60 is shown including an example allowable geographic area 90 generated by the mapping engine 20 in response to an indication of the allowable geographic area received from the overseer user client 30. The example allowable geographic area 90 includes a path along the streets 64 preferably received from the overseer user client 30 as an indication of a desired route and a maximum distance which the subject user is permitted to veer away from the selected route, or alternatively, an indication of a desired route and the route width. The mapping engine 20 is preferably configured to use stored streetscape data to generate the allowable geographic area 90 based on the indication of the desired route and the maximum distance which the subject user is permitted to veer away from the selected route or the indication of the route width. Allowable geographic areas may alternatively be generated in the manners in which the first, second, third, and fourth disallowable geographic areas 80, 82, 84, 86 shown in FIG. 2 are generated.

In the case where an overseeing user through the overseer user client 30 transmits an indication of one or more allowable geographic areas to the location server 12, the location server 12 preferably further receives via the management API 18 an indication of allowable points of interest types from the overseer user client 30. Predefined points of interest types are preferably provided by the management API 18 to the overseeing user for selection via the overseer user client 30. Predefined points of interest types preferably include one or more of the following: private residences, addresses in a network-accessible address book of the overseeing user, public parks, playgrounds, schools, grocery stores, libraries, department stores, and restaurants. Customized points of interest types may further be defined by the overseeing user via the management API 18. The mapping engine 20 stores points of interest corresponding to the points of interest types selectable through the overseer user client 30. The mapping engine 20 is configured to generate an indication of one or more extended areas comprising areas defined by points of interest in contact with or within a predetermined distance from the one or more allowable geographic areas, which points of interest correspond to the user-selected points of interest types. The mapping engine 20 extends the indication of one or more allowable geographic areas to include the one or more extended areas, and the management API 18 transmits the indication of a reward to the subject user mobile device 40 upon a failure of the subject user mobile device 40 to exit the allowable geographic area including the extended area or areas during the predetermined period of time. Alternatively, the location server 12 is configured to log a duration of time in which the mobile device 40 maintains a continuous presence in the allowable geographic area during the predetermined period of time, and to transmit the indication of a reward to the user mobile device 40 in response to logging a predetermined value of the duration of time in which the mobile device maintains a continuous presence in the allowable geographic area.

Figure 4:
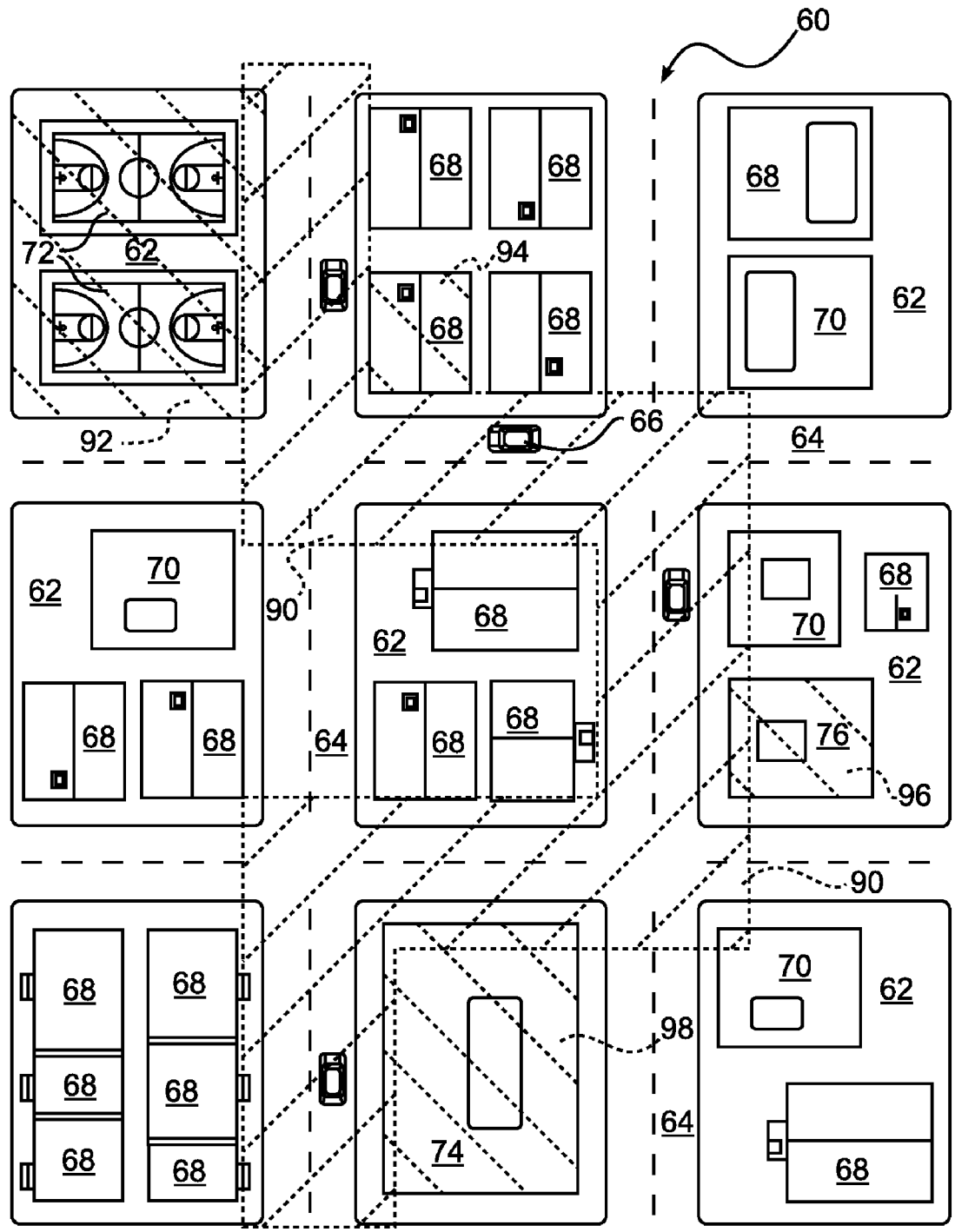

Referring to FIG. 4, a plan view of the example city streetscape 60 showing the allowable geographic area 90 depicted in FIG. 3 and additionally showing first, second, third and fourth extended areas 92, 94, 96, and 98 generated by the mapping engine 20. In the example of FIG. 4, an overseeing user has provided schools, libraries, playgrounds, and the subject user's residence as indications of allowable points of interest types. Accordingly, the mapping engine 20 generates extended areas 92, 94, 96 and 98 respectively corresponding to playgrounds 72, a home 68 of the subject user, a library 76, and a school 74 having property boundaries in contact with or within a predetermined distance from the allowable geographic area 90. The extended area 92 corresponds to a footprint area of the block 62 on which the playgrounds 72 are located. The extended area 94 corresponds to an approximate footprint area of the home 68. The extended area 96 corresponds to an approximate footprint area of the library 76. The extended area 98 corresponds to an approximate footprint area of the school 74. Accordingly, the allowable area through which a subject user is permitted to travel includes the allowable geographic area 90 and the first, second, third and fourth areas 92, 94, 96 and 98. The mapping engine 20 is optionally configured to generate a plurality of time-based geographic area designations corresponding to the allowable areas 90, 92, 94, 96 and 98 such that for example the extended area 98 corresponding to the school 74 is only allowable during a first time period defined between 9:00 am and 3:00 pm, the extended area 96 corresponding to the library 76 is only allowable between the hours of 2:00 pm and 5:00 pm, and the extended area 94 corresponding to the home 68 is only allowable between the hours of 4:00 pm and 9:00 am, and the allowable area 90, providing a path for travel between destinations, is only allowable between the hours of 8:00 am and 9:00 am, 2:00 pm and 3:00 pm, and 4:00 pm and 5:00 pm.

As indicated above, the location server 12 is configured to receive via the location API 16 an indication of a plurality of positions of the subject user mobile device 40, wherein each of the plurality of positions is associated with a time of position recordation. The mapping engine 20 is further preferably configured to determine one or more average speeds of the subject user mobile device 40 based on the indication of the plurality of positions and the associated times of position recordation. The indication of a reward is transmitted in response to determining that the one or more average speeds do not exceed a predetermined maximum speed associated with the at least one geographic area. Such predetermined maximum speeds preferably correspond to maximum legal speeds for roads and portions of roads stored as values by the mapping engine. Alternatively, such predetermined maximum speeds correspond to values provided by the overseeing user through the overseer user client 30 via the management API 18. At the option of the overseeing user, the mapping engine 20 modifies the indication of the one or more allowable geographic areas in response to logging the one or more failures of the mobile device 40 to exceed a predetermined maximum speed during a predetermined period of time, wherein modifying the one or more allowable geographic areas preferably includes adding one or more allowable geographic areas consistent with a rules set provided by the overseeing user via the management API 18 to create one or more modified allowable geographic areas larger than the original allowable geographic area. Further at the option of the overseeing user in response to logging one or more failures of the mobile device 40 to exceed a predetermined maximum speed during a predetermined period of time, the mapping engine 20 preferably modifies the indication of the plurality of periods of time preferably by increasing the duration of ones of the plurality of periods of time corresponding to one or more larger or greater in number allowable geographic areas and decreasing the duration of ones of the plurality of periods of time corresponding to one or more smaller or lesser in number allowable geographic areas consistent with a rules set provided by the overseeing user. Thereafter, generation and transmission of the indication of a reward may be based on a comparison of the mobile device location information and an indication of the modified allowable geographic area or areas and/or modified plurality of periods of time. In the case where indications of disallowable geographic areas are provided by the overseeing user, those indications may also be modified in response to logging one or more failures of the mobile device 40 to exceed a predetermined maximum speed.

In another preferred operation mode of the location server 12, an indication of one or more geographic areas is preferably received from the overseer user client 30 through the management API 18 as an indication of one or more dynamic geographic areas. A position or shape of the one or more dynamic geographic areas is changeable during a predetermined period of time which is provided by the overseer user client 30. More preferably, the indication of the one or more geographic areas is received as an indication of one or more allowable geographic areas determinable as a function of a position of another user mobile device such as an overseer user mobile device functioning as the overseer user client 30. In such case, the position or shape of the one or more dynamic geographic areas is determined as a function of a position of the overseer user client 30. The location server 12 via the location API 16 is configured to receive the mobile device location information of the overseer user client 30, and the mapping engine 20 determines the one or more allowable geographic areas based on a position of the overseer user client 30. The mapping engine 20 modifies the one or more allowable geographic areas at predetermined time intervals based on a change in a position of the overseer user client 30. The location server 12 is further configured to receive via the location API 16 location information of the subject user mobile device 40. The mapping engine 20 is configured to compare location information of the subject user mobile device 40 with the one or more allowable geographic areas at predetermined time intervals. Preferably, an indication of a reward is transmitted to the user mobile device 40 via the management API 18 based on a failure of the mobile device to exit the one or more allowable geographic areas during the predetermined period of time as indicated by the location information of the subject user mobile device 40.

Alternatively, the one or more dynamic geographic areas may be determinable as a function of a position of any user, and the dynamic geographic areas used as a basis for comparison need not be designated as allowable or disallowable. The mapping engine 20 may determine when the subject user mobile device 40 enters a dynamic geographic area determined by the position of one or more other user mobile devices, which may be for example user mobile devices of peers or friends of the subject user. The indication of a reward may be transmitted via the management API 18 as a notification to the subject user mobile device 40 informing the subject user that the subject user mobile device 40 is for example in proximity to one or more other user mobile devices of the friends of the subject user. The location server 12 configured as such may for example be useful for implementing game rules or implementing safety systems requiring two or more users to maintain a predetermined distance proximity.

Figure 5:
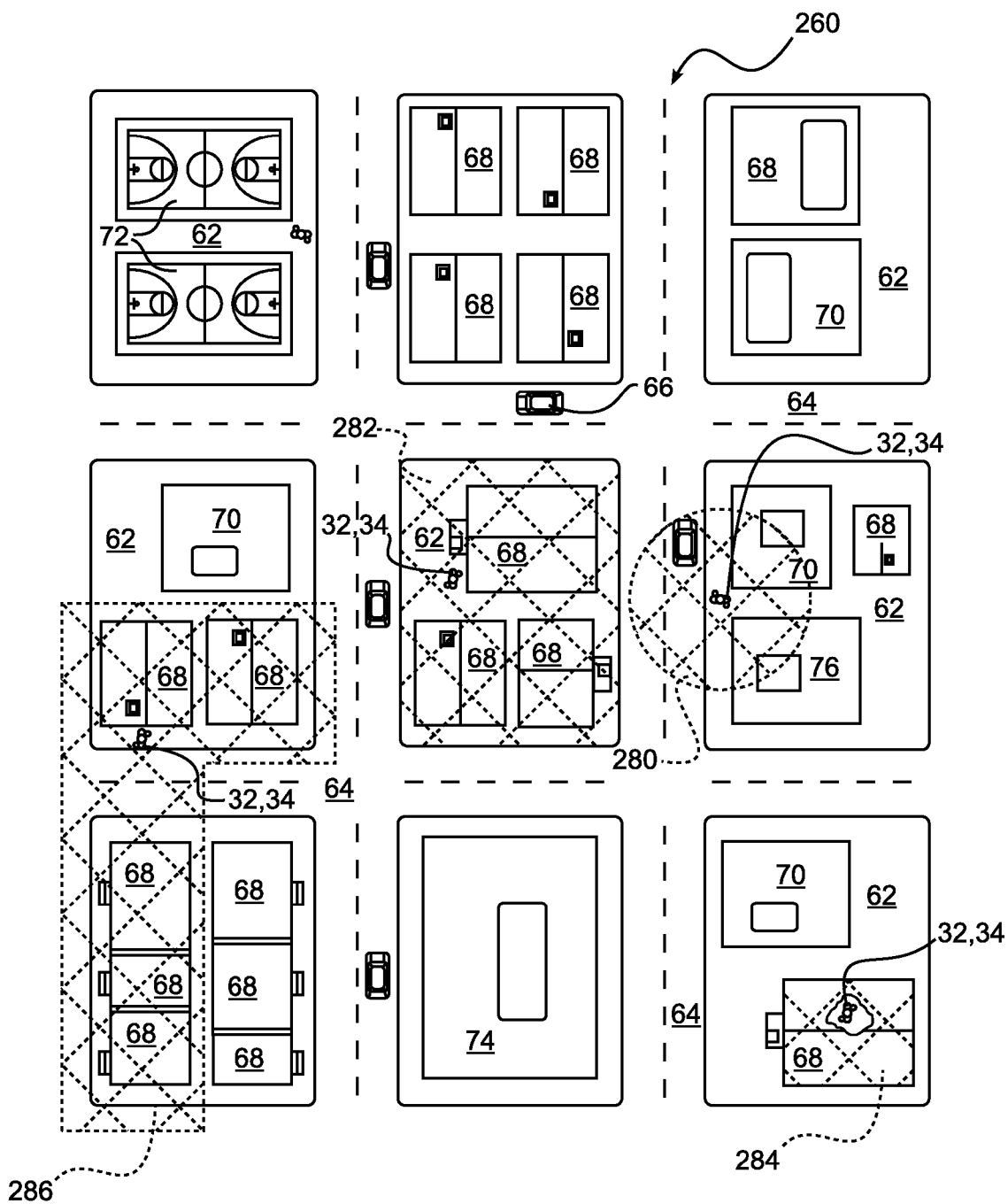

Referring to FIG. 5, a plan view of the example city streetscape 60 is shown further including human forms which represent either overseeing users 32 carrying user clients 30 in the form of locatable mobile devices, or peer users 34 carrying suitable locatable mobile devices. In this example, the location server 12 receives through the management API 18 indications of different manners of associating determined positions of the overseer users 32 or peer users 34 with a geographic area. Each indication of a geographic area is preferably received from the overseer user client 30 or a client associated with the peer user 34 as an indication of how a geographic area is desired to be generated relative to the position of the overseeing user or peer user, wherein the management API 18 provides a plurality of predetermined selectable manners of associating a geographic area with the user position. A first preferred user-selectable manner in which a geographic area is to be associated with a user position includes defining a geographic area by a radius extending from an approximate position of the overseeing user 32 or peer user 34 as determined by the position of their mobile device, as shown for example by a first dynamic geographic area 280, which is a circular area having center at the approximate position of the mobile device of the overseeing user 32 or peer user 34. A second preferred user-selectable manner in which a geographic area is to be associated with a user position includes defining a geographic area by a perimeter of a block 62 on which a user is positioned, as shown for example by a second dynamic geographic area 282. A third preferred user-selectable manner in which a geographic area is to be associated with a user position includes defining a geographic area by a perimeter of a property on which a user is positioned, as shown for example by a third dynamic geographic area 284. A fourth preferred user-selectable manner in which a geographic area is to be associated with a user position includes defining a geographic area by a predetermined neighborhood in the form of an irregular polygon in which the user is positioned, as shown for example by a fourth dynamic geographic area 286. Alternative user-selectable manners in which an area is to be associated with a user position include by region, city, state or any definable area of any suitable shape including circular, elliptical, polygonal, or irregular. The mapping engine 20 is preferably configured to use stored streetscape data to generate the dynamic geographic area based on the overseer or peer user position and the selected manner in which a geographic area is desired to be associated with the user position.

Figure 6:
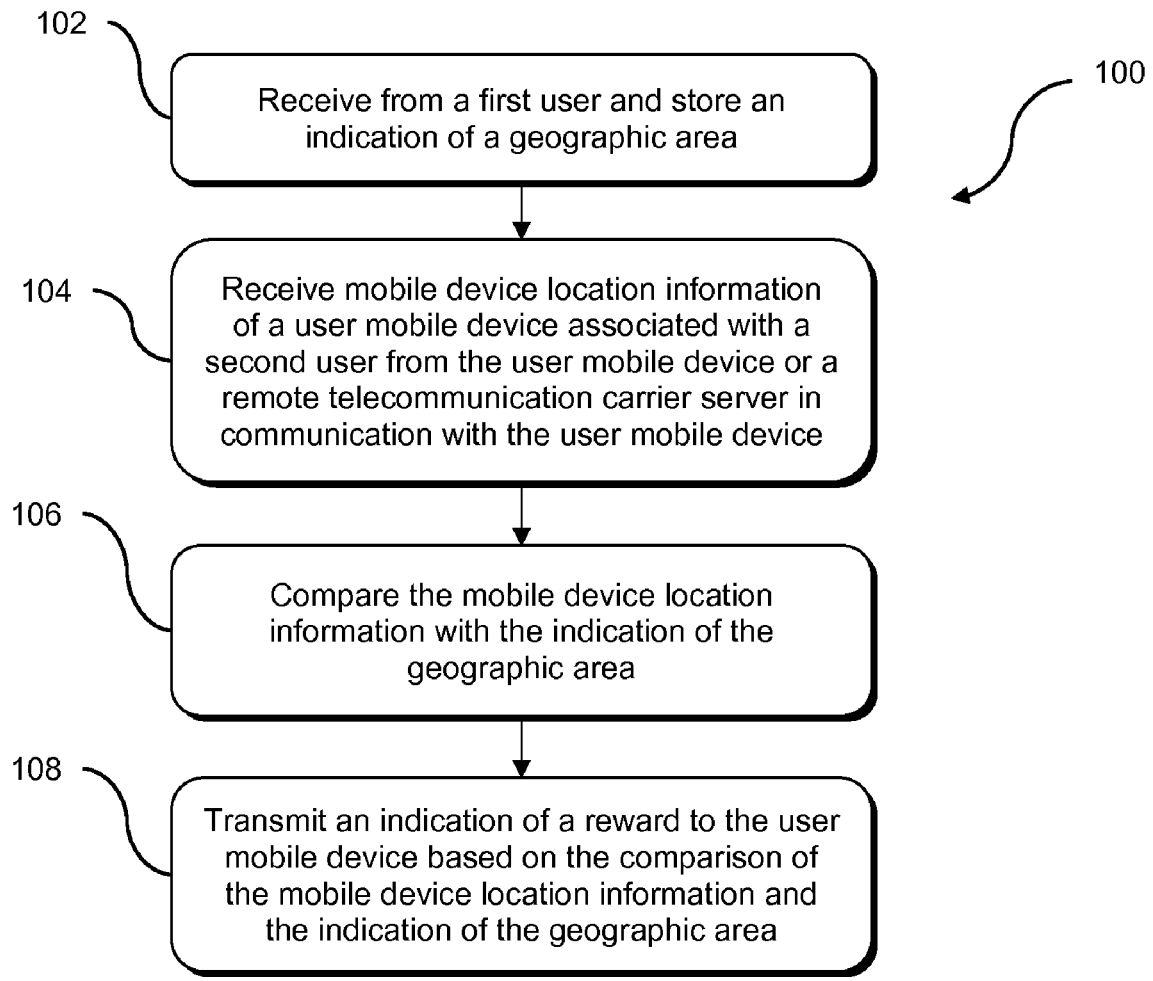
FIG. 6 is a flow chart showing a computer-implemented method of rewarding a user based on compliance with predetermined geographic limitations according to a preferred embodiment of the present invention.

Referring to FIG. 6, a computer-implemented method 100 is shown of rewarding a user based on compliance with predetermined geographic limitations according to a preferred embodiment of the present invention. The method includes receiving from a first user and storing an indication of one or more geographic areas (step 102). Mobile device location information of a user mobile device associated with a second user is received from the user mobile device or a remote telecommunication carrier server in communication with the user mobile device (step 104). The mobile device location information is compared with the indication of the one or more geographic areas (step 106), and an indication of a reward is transmitted to the user mobile device based on the comparison of the mobile device location information and the indication of the one or more geographic areas (step 108).

While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A computer-implemented method of rewarding a user based on compliance with predetermined geographic limitations comprising:
   receiving from a first user and storing an indication of at least one geographic area comprising an indication of a dynamic geographic area determinable as a function of a device position;
   receiving mobile device location information of a user mobile device associated with a second user from at least one of the user mobile device and a remote telecommunication carrier server in communication with the user mobile device;
   receiving mobile device location information of another user mobile device;
   determining the dynamic geographic area based on a position of the another user mobile device;
   modifying the dynamic geographic area based on a change in a position of the another user mobile device;
   comparing the mobile device location information of the user mobile device associated with the second user with the indication of the at least one geographic area comprising the indication of the dynamic geographic area; and
   transmitting an indication of a reward to the user mobile device associated with the second user as a notification based on at least one of the user mobile device associated with the second user entering and exiting the dynamic geographic area as indicated by the mobile device location information.

2. The computer-implemented method of claim 1, further comprising:
   receiving from the first user an indication of at least one disallowable geographic area;
   receiving from the first user an indication of a predetermined period of time; and
   transmitting the indication of a reward to the user mobile device based on a failure of the user mobile device to enter the disallowable geographic area during the predetermined period of time as indicated by the mobile device location information.

3. The computer-implemented method of claim 1, further comprising:
   receiving from the first user an indication of at least one allowable geographic area;
   receiving from the first user an indication of a predetermined period of time; and
   transmitting the indication of a reward to the user mobile device based on a failure of the user mobile device to exit the allowable geographic area during the predetermined period of time as indicated by the mobile device location information.

4. The computer-implemented method of claim 1, further comprising:
   generating an indication of at least one extended area comprising a footprint area including at least one predetermined point of interest, the footprint area being in contact with the at least one geographic area; and
   transmitting the indication of a reward to the user mobile device based on the comparison of the mobile device location information and the indication of the at least one extended area.

5. The computer-implemented method of claim 1, further comprising:
   receiving from the first user an indication of at least one allowable point of interest type;
   associating the at least one allowable point of interest type with at least one predetermined point of interest;
   generating an indication of at least one extended area comprising a footprint area including the at least one predetermined point of interest, the footprint area being in contact with the at least one geographic area; and
   transmitting the indication of a reward to the user mobile device based on the comparison of the mobile device location information and the indication of the at least one extended area.

6. The computer-implemented method of claim 1, further comprising
   receiving from the first user an indication of at least one disallowable geographic area;
   receiving from the first user an indication of a plurality of predetermined periods of time;
   logging a plurality of failures of the user mobile device to enter the disallowable geographic area during the plurality of predetermined periods of time as indicated by the mobile device location information; and
   transmitting the indication of a reward to the user mobile device in response to logging a predetermined number of the plurality of failures of the user mobile device to enter the disallowable geographic area.

7. The computer-implemented method of claim 1, further comprising
   receiving from the first user an indication of at least one allowable geographic area;

receiving from the first user an indication of at least one predetermined period of time;

logging a duration of time in which the user mobile device maintains a continuous presence in the allowable geographic area during the at least one predetermined period of time as indicated by the mobile device location information; and transmitting the indication of a reward to the user mobile device in response to logging a predetermined value of the duration of time in which the user mobile device maintains a continuous presence in the allowable geographic area.

8. The computer-implemented method of claim 1, further comprising receiving from the first user an indication of at least one allowable geographic area;

receiving from the first user an indication of at least one predetermined period of time;

logging at least one failure of the user mobile device to exit the allowable geographic area during the at least one predetermined period of time as indicated by the mobile device location information; and transmitting the indication of a reward to the user mobile device in response to logging the at least one failure of the user mobile device to exit the allowable geographic area during the at least one predetermined period of time.

9. The computer-implemented method of claim 8, further comprising transmitting an indication to a remote value server to transmit value from a first account associated with the first user to a second account associated with the second user in response to logging the at least one failure of the user mobile device to exit the allowable geographic area during the at least one predetermined period of time.

10. The computer-implemented method of claim 1, further comprising transmitting an indication to a remote value server to transmit value from a first account associated with the first user to a second account associated with the second user in response to logging at least one failure of the user mobile device to exit the dynamic geographic area during at least one predetermined period of time.

11. The computer-implemented method of claim 1, further comprising transmitting at least one digital good to the user mobile device based on the comparison of the mobile device location information and the indication of the at least one geographic area.

12. The computer-implemented method of claim 1, further comprising transmitting an instruction to a telecommunication carrier account privileges infrastructure to adjust communication permissions of the user mobile device based on the comparison of the mobile device location information and the indication of the at least one geographic area.

13. The computer-implemented method of claim 1, further comprising transmitting an indication to a remote value server to transmit value from a first account associated with the first user to a second account associated with the second user based on the comparison of the mobile device location information and the indication of the at least one geographic area.

14. The computer-implemented method of claim 1, further comprising transmitting an indication to a remote banking server to transmit monetary value from a first account associated with the first user to a second account associated with the second user based on the comparison of the mobile device location information and the indication of the at least one geographic area.

15. The computer-implemented method of claim 1, further comprising transmitting the indication of a reward to the user mobile device as an indication of redeemable value.

16. The computer-implemented method of claim 1, further comprising:

receiving from the first user an indication of a first allowable geographic area;

receiving from the first user an indication of a second allowable geographic area;

receiving from the first user an indication of at least one predetermined period of time;

logging at least one failure of the user mobile device to exit the first allowable geographic area during the at least one predetermined period of time as indicated by the mobile device location information;

transmitting an indication of a first reward to the user mobile device comprising an identification of the second allowable geographic area in response to logging the at least one failure of the user mobile device to exit the first allowable geographic area during the at least one predetermined period of time;

logging at least one failure of the user mobile device to exit the first allowable geographic area and the second allowable geographic area during the at least one predetermined period of time as indicated by the mobile device location information; and transmitting an indication of a second reward following the indication of the first reward to the user mobile device in response to logging the at least one failure of the user mobile device to exit the first allowable geographic area and the second allowable geographic area during the at least one predetermined period of time.

17. The computer-implemented method of claim 1, further comprising receiving from the first user an indication of at least one allowable geographic area;

receiving from the first user an indication of a first predetermined period of time;

receiving from the first user an indication of a second predetermined period of time;

logging at least one failure of the user mobile device to exit the at least one allowable geographic area during the first predetermined period of time as indicated by the mobile device location information;

transmitting an indication of a first reward to the user mobile device comprising an identification of the second predetermined period of time in response to logging the at least one failure of the user mobile device to exit the at least one allowable geographic area during the first predetermined period of time;

logging at least one failure of the user mobile device to exit the at least one allowable geographic area during the second predetermined period of time as indicated by the mobile device location information following the transmission of the indication of the first reward; and transmitting an indication of a second reward following the indication of the first reward to the user mobile device in response to logging the at least one failure of the user mobile device to exit the at least one allowable geographic area during the second predetermined period of time.

18. The computer-implemented method of claim 1, further comprising receiving from the first user an indication of at least one allowable geographic area;

receiving from the first user an indication of a plurality of predetermined periods of time;

logging at least one failure of the user mobile device to exit the at least one allowable geographic area during at least one of the plurality of periods of time as indicated by the mobile device location information;

transmitting an indication of at least one reward to the user mobile device comprising an identification of at least another one of the plurality of predetermined periods of time in response to logging the at least one failure of the user mobile device to exit the at least one allowable geographic area during the at least one of the plurality of predetermined periods of time;

logging at least one failure of the user mobile device to exit the at least one allowable geographic area during the at least another one of the plurality of predetermined periods of time as indicated by the mobile device location information following the transmission of the indication of the at least one reward; and transmitting an indication of at least another reward following the indication of the at least one reward to the user mobile device in response to logging the at least one failure of the user mobile device to exit the at least one allowable geographic area during the at least another one of the plurality of predetermined periods of time.

19. The computer-implemented method of claim 1, further comprising:

receiving from the first user information comprising a rules set for modifying the indication of at least one geographic area;

modifying the indication of the at least one geographic area based on the comparison of the mobile device location information and the indication of the at least one geographic area to produce an indication of an at least one modified geographic area in accordance with the rules set;

comparing the mobile device location information with the indication of the at least one modified geographic area; and transmitting the indication of a reward to the user mobile device based on the comparison of the mobile device location information and the indication of the at least one modified geographic area.

20. The computer-implemented method of claim 1, further comprising:

receiving information comprising an indication of a plurality of positions of the user mobile device, wherein each of the plurality of positions is associated with a time of position recordation;

determining at least one average speed of the user mobile device based on the indication of the plurality of positions and the associated times of position recordation; and transmitting the indication of a reward in response to determining that the at least one average speed does not exceed a predetermined maximum speed associated with the at least one geographic area.

21. The computer-implemented method of claim 20, further comprising:

receiving from the first user information comprising a rules set for modifying the indication of at least one geographic area;

modifying the indication of the at least one geographic area based on the determining that the at least one average speed does not exceed a predetermined maximum speed associated with the at least one geographic area to produce an indication of at least one modified geographic area larger than the at least one geographic area in accordance with the rules set;

comparing the mobile device location information with the indication of the at least one modified geographic area; and transmitting another indication of a reward to the user mobile device in response to the user mobile device not exiting the at least one modified geographic area as indicated by the mobile device location information.

22. The computer-implemented method of claim 1, wherein the transmitting the indication of a reward comprises transmitting at least one of a commendation, a rebuke, and a notification.

23. The computer-implemented method of claim 1, further comprising:

receiving from the first user an indication of a plurality of geographic areas and a plurality of periods of time, wherein each of the plurality of geographic areas corresponds to a respective one of the plurality of periods of time;

generating a plurality of time-based geographic area designations from the indication of the plurality of geographic areas corresponding to the respective ones of the plurality of periods of time received from the first user;

receiving the mobile device location information as a plurality of positions of the user mobile device corresponding to respective times of position recordation;

comparing the time-based geographic area designations with the plurality of positions of the user mobile device as corresponding to respective times of position recordation; and transmitting the indication of a reward to the user mobile device based on the comparison of the time-based geographic area designations with the plurality of positions of the user mobile device as corresponding to respective times of position recordation.

24. The computer-implemented method of claim 1, further comprising:

receiving from the first user an indication of a plurality of allowable geographic areas and a plurality of periods of time, wherein each of the plurality of allowable geographic areas corresponds to a respective one of the plurality of periods of time;

generating a plurality of time-based allowable geographic area designations from the indication of the plurality of allowable geographic areas corresponding to the respective ones of the plurality of periods of time received from the first user;

receiving the mobile device location information as a plurality of positions of the user mobile device corresponding to respective times of position recordation;

comparing the time-based allowable geographic area designations with the plurality of positions of the user mobile device as corresponding to respective times of position recordation to determine a user mobile device compliance with the plurality of time-based allowable geographic area designations; and transmitting the indication of a reward to the user mobile device based on the user mobile device compliance with the time-based allowable geographic area designation.

25. The computer-implemented method of claim 1, further comprising:

receiving from the first user an indication of a predetermined period of time;

wherein at least one of a position and a shape of the at least one dynamic geographic area is changeable during the predetermined period of time.

26. The computer-implemented method of claim 1, further comprising:

receiving from the first user an indication of a predetermined period of time;

receiving from the first user at least one of an indication of a predetermined number of permitted exits from the at least one geographic area and an indication of a predetermined number of permitted entrances into the at least one geographic area; and transmitting the indication of a reward to the user mobile device in response to the user mobile device exceeding at least one of the predetermined number of permitted exits from and the predetermined number of permitted entrances into the at least one geographic area during the predetermined period of time as indicated by the mobile device location information;

wherein the transmitting the indication of a reward comprises transmitting at least one of a commendation and a rebuke.

27. The computer-implemented method of claim 1, further comprising:

receiving from the first user an indication of a first geographic area corresponding to a first predetermined period of time and an indication of a second geographic area corresponding to a second predetermined period of time;

comparing the mobile device location information with the indication of the first geographic area during the first predetermined period of time;

comparing the mobile device location information with the indication of the second geographic area during the second predetermined period of time; and transmitting the indication of a reward to the user mobile device based on the comparison during the first predetermined period of time and the comparison during the second predetermined period of time.

28. The computer-implemented method of claim 1, further comprising:

receiving from the first user an indication of a first geographic area corresponding to a first daily-recurring predetermined period of time and an indication of a second geographic area corresponding to a second daily-recurring predetermined period of time;

comparing the mobile device location information with the indication of the first geographic area during the first daily-recurring predetermined period of time;

comparing the mobile device location information with the indication of the second geographic area during the second daily-recurring predetermined period of time; and transmitting the indication of a reward to the user mobile device based on the comparison during the first daily-recurring predetermined period of time and the comparison during the second daily-recurring predetermined period of time.

29. A computer-implemented method of rewarding a user based on compliance with predetermined geographic limitations comprising:

receiving from a first user an indication of a predetermined period of time;

receiving from the first user and storing an indication of at least one allowable dynamic geographic area, wherein at least one of a position and a shape of the at least one allowable dynamic geographic area is changeable during the predetermined period of time and determinable as a function of a device position;

receiving mobile device location information of a user mobile device associated with a second user from at least one of the user mobile device and a remote telecommunication carrier server in communication with the user mobile device;

receiving mobile device location information of another user mobile device, the another user mobile device associated with the first user;

determining the at least one allowable dynamic geographic area based on a position of the another user mobile device;

modifying the at least one allowable dynamic geographic area based on a change in a position of the another user mobile device;

comparing the mobile device location information of the user mobile device associated with the second user with the indication of the at least one allowable dynamic geographic area; and transmitting the indication of a reward to the user mobile device associated with the second user based on a failure of the user mobile device associated with the second user to exit the allowable geographic area during the predetermined period of time as indicated by the mobile device location information.

30. A system for rewarding a user based on compliance with predetermined geographic limitations comprising at least one computing device including at least one memory comprising instructions operable to enable the computing device to perform a procedure comprising:

receiving from a first user and storing an indication of at least one allowable dynamic geographic area associated with a second user;

receiving from the first user an indication of at least one predetermined period of time;

receiving mobile device location information of a user mobile device associated with the second user from at least one of the user mobile device and a remote telecommunication carrier server in communication with the user mobile device;

receiving mobile device location information of another user mobile device;

determining the at least one allowable dynamic geographic area based on a position of the another user mobile device;

modifying the at least one allowable dynamic geographic area based on a change in a position of the another user mobile device;

logging at least one failure of the user mobile device to exit the at least one allowable dynamic geographic area during the at least one predetermined period of time as indicated by the mobile device location information; and transmitting an indication of a reward to the user mobile device in response to logging the at least one failure of the user mobile device to exit the at least one allowable dynamic geographic area during the at least one predetermined period of time.

31. The system of claim 30, wherein the memory further includes instructions operable to enable the computing device to perform a procedure comprising:

receiving from the first user an indication of at least one allowable point of interest type;

associating a plurality of points of interest with the at least one allowable point of interest type;

generating an indication of at least one extended area comprising an area defined by the at least one of the plurality of points of interest in contact with the at least one allowable dynamic geographic area; and extending the indication of the at least one allowable dynamic geographic area to include the at least one extended area.

32. A system for rewarding a user based on compliance with predetermined geographic limitations comprising at least one computing device including at least one memory comprising instructions operable to enable the computing device to perform a procedure comprising:
receiving and storing an indication of at least one geographic area comprising an indication of a dynamic geographic area determinable as a function of a device position;
receiving mobile device location information of a user mobile device associated with a user from at least one of the user mobile device and a remote telecommunication carrier server in communication with the user mobile device;
receiving mobile device location information of another user mobile device;
determining the dynamic geographic area based on a position of the another user mobile device;
modifying the dynamic geographic area based on a change in a position of the another user mobile device;
comparing the mobile device location information of the user mobile device associated with the user with the indication of the at least one geographic area comprising the indication of the dynamic geographic area; and
generating an indication of a reward for transmission to the user based on at least one of the user mobile device entering and exiting the dynamic geographic area as indicated by the mobile device location information.

33. The system of claim 32, wherein the memory further includes instructions operable to enable the computing device to perform a procedure comprising:
receiving an indication of at least one disallowable geographic area;
receiving an indication of a predetermined period of time; and
generating the indication of a reward based on a failure of the user mobile device to enter the disallowable geographic area during the predetermined period of time as indicated by the mobile device location information.

34. The system of claim 32, wherein the memory further includes instructions operable to enable the computing device to perform a procedure comprising:
generating the indication of a reward as an indication of redeemable value;
receiving a request for the indication of redeemable value; and
transmitting the indication of redeemable value in response to the request.

35. The system of claim 32, wherein the memory further includes instructions operable to enable the computing device to perform a procedure comprising:
generating at least one of a path, an elliptical geographic area, a circular geographic area, and a polygonal geographic area based on the indication of at least one geographic area;
comparing the mobile device location information with the at least one of the path, the elliptical geographic area, the circular geographic area, and the polygonal geographic area; and
generating the indication of a reward based on the comparison of the mobile device location information and the at least one of the path, the elliptical geographic area, the circular geographic area, and the polygonal geographic area.

36. The system of claim 32, wherein the memory further includes instructions operable to enable the computing device to perform a procedure comprising:
receiving and storing the indication of at least one geographic area as an indication of a plurality of geographic areas; and
transmitting an instruction to a telecommunication carrier account privileges infrastructure to adjust from which of the plurality of geographic areas the user mobile device can at least one of send data to and receive data from, send SMS messages to and receive SMS messages from, and place voice telephone calls to and receive voice telephone calls from based on the comparison of the mobile device location information and the indication of the plurality of geographic areas.

37. The system of claim 32, wherein the memory further includes instructions operable to enable the computing device to perform a procedure comprising:
receiving and storing the indication of at least one geographic area as an indication of a plurality of geographic areas; and
transmitting an instruction to a telecommunication carrier account privileges infrastructure to change which of a plurality of telephone numbers the user mobile device can at least one of send data to and receive data from, send SMS messages to and receive SMS messages from, and place voice telephone calls to and receive voice telephone calls from based on the comparison of the mobile device location information and the indication of the plurality of geographic areas.

\* \* \* \* \*